United States Patent [19]

Engwall

[11] Patent Number: 5,096,526

[45] Date of Patent: Mar. 17, 1992

[54] CORE BONDING AND FORMING OF THERMOPLASTIC LAMINATES

[75] Inventor: Dwight L. Engwall, Wichta, Kans.

[73] Assignee: The Boeing Company, Seattle, Wash.

[21] Appl. No.: 443,155

[22] Filed: Nov. 30, 1989

[51] Int. Cl.⁵ .............................................. B29C 51/00
[52] U.S. Cl. ...................................... 156/197; 156/245
[58] Field of Search ................... 156/197, 245, 306.6; 428/118

[56] References Cited

U.S. PATENT DOCUMENTS

| | | |
|---|---|---|
| 2,385,352 | 9/1945 | Davis . |
| 2,837,779 | 6/1958 | Jacobs . |
| 3,388,522 | 6/1968 | Lowes . |
| 3,503,838 | 3/1970 | Marshack . |
| 3,607,518 | 9/1971 | Ellinor . |
| 3,617,416 | 11/1971 | Kromrey . |
| 3,728,186 | 4/1973 | Mohn . |
| 3,769,145 | 10/1973 | Gresham et al. . |
| 3,801,405 | 4/1974 | Corkery et al. . |
| 4,093,482 | 6/1978 | Ogata et al. . |
| 4,315,050 | 2/1982 | Rourke . |
| 4,344,995 | 8/1982 | Hammer . |
| 4,416,716 | 11/1983 | Ichikawa et al. . |
| 4,522,284 | 6/1985 | Fearon et al. . |
| 4,548,665 | 10/1985 | Morin ............................ 428/118 X |
| 4,641,726 | 2/1987 | Fearon et al. . |
| 4,902,365 | 2/1990 | Westlake, Sr. .................. 428/118 X |

Primary Examiner—David A. Simmons
Assistant Examiner—James J. Engel, Jr.
Attorney, Agent, or Firm—Finnegan, Henderson, Farabow, Garrett & Dunner

[57] ABSTRACT

A process for making a shaped structure including a high melt temperature thermoplastic laminate surface and a honeycomb core substrate, by heating the laminate to its melt temperature above about 600° F., pressing one surface of the core into the laminate, and forming the core and laminate on a molding tool.

15 Claims, 1 Drawing Sheet

CORE BONDING AND FORMING OF THERMOPLASTIC LAMINATES

BACKGROUND OF THE INVENTION

1. Field of The Invention

The invention relates to forming a shaped structure from a high melt temperature thermoplastic laminate and a core and, in particular, to a process for bonding a thermoplastic laminate at its high melt temperature to a honeycomb core and subsequently shaping the structure on a molding tool.

2. Description of Related Art

There are many known processes for bonding and shaping thermoplastic laminates to honeycomb cores. These processes, such as disclosed in U.S. Pat. Nos. 3,607,518, 3,617,416, 4,416,716, 4,522,284 and 4,641,726, are designed for use with low temperatures (< 400° F.), temperature-sensitive cores such as paper, and/or solvent-based adhesives.

In modern aircraft manufacture, however, high melt temperature thermoplastics are used on honeycomb cores to form shaped structures. Prior to this invention, such high temperature plastics have been bonded to the cores with thermosetting adhesives rather than direct bonding. The thermosetting adhesive provided poor bonds having strengths less than that of the thermoplastic laminate.

The invention provides a method of forming shaped structures of high melt temperature thermoplastics without thermosetting adhesives and without heat damage to the cores during bonding.

The advantages of the invention are set forth in part in the description which follows, and in part will be obvious from the description or may be learned by practice of the invention. The advantages of the invention may be realized and attained by the means of instrumentalities and combinations pointed out in the appended claims.

SUMMARY OF THE INVENTION

In accordance with the invention, as embodied and broadly including a high melt temperature thermoplastic laminate surface and a honeycomb core substrate comprises the steps of disposing the laminate on a heat source, heating the laminate to its melt temperature above about 600° F., pressing one surface of the core into the laminate on the heat source to form a bond therebetween removing the bonded core and laminate from the heat source, and forming the shaped structure on a molding tool, the laminate being disposed adjacent the tool.

In an alternative embodiment, the process further includes the step of pressing a second layer of thermoplastic laminate heated to its melt temperature on the other surface of the core during the step of forming the shaped structure.

In another embodiment, when the thermoplastic laminate is resin deficient, the process further may include the step of disposing a layer of thermoplastic resin between the laminate and the core surface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of the specification, illustrate the embodiments of the invention, and, together with the description, serve to explain the principles of the invention.

DESCRIPTION OF THE PREFERRED EMBODIMENTS

Reference will now be made in detail to the present preferred embodiments to the invention, examples of which are illustrated the accompanying drawings.

In accordance with the invention, the process for making a shaped structure including a high melt temperature thermoplastic laminate surface and a honeycomb core substrate comprises the steps of disposing the laminate on a heat source and heating the laminate to its melt temperature above about 600° F.

In the preferred embodiment, the laminate is formed of a thermoplastic having a high melt temperature. Such laminates include those formed of proprietary polyphenylene sulfide marketed by Phillips Petroleum Co. under the name "PPS", polyetheretherketone marketed by ICI Americas, Inc. under the name PEEK, or polyethermide marketed by General Electric Co. under the name ULTEM TM. The melt temperature of PPS is about 600° F., of PEEK is about 700°-720° F., and of ULTEM TM is about 680°-700° F. Other thermoplastics having high melt temperatures may also be used.

The preferred embodiments of the invention contemplate use of a honeycomb core of known construction formed of aluminum, phenolic, or aramid fibres specially fabricated and marketed by DuPont (United Kingdom) Ltd. under the name NOMEX TM. The service temperature of aluminum cores is about 350°-400° F., of phenolic cores is about 500° F., and of NOMEX TM is about 350° F. Cores formed of other materials may also be used. The preferrable core materials will be able to withstand transient peak temperatures of about 700° F. during bonding without damage; cores of material having this characteristic may be used in the process of the invention.

Figure 1:
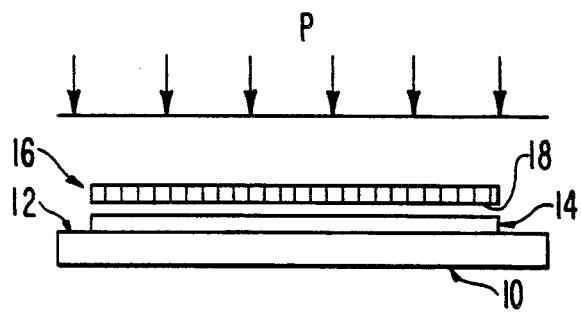
FIG. 1 is a schematic side view of an apparatus for performing the first steps of the first embodiment of the invention.

Preferably, as depicted in FIG. 1, heat source 10 defines generally planar surface 12, although the heat source may have some limited shaping effect so long as the laminate can be maintained at its melt temperature. Heat source 10 may be a heated platen or a heat-transparent surface permitting infrared heating. The heat source may be any device which provides a surface on which to dispose laminate 14 for heating and bonding and is capable of heating to the required high melt temperatures. Preferably, laminate 14 is disposed on surface 12 of heat source 10 and is heated to about its melt temperature above about 600° F. The invention contemplates heating laminate 14 to its melt temperature at a remote location and moving it to a heated platen for support, the platen being heated sufficiently to maintain the melt temperature. This latter alternative is not generally preferred because of the problems involved in moving a laminate at its melt temperature while maintaining its temperature and shape.

In accordance with the invention, the process comprises the step of pressing one surface of the core into the laminate on the heat source to form a bond therebetween. As depicted in FIG. 1, laminate 14 is disposed on surface 12 in opposition to any known press (not shown). Core 16 is disposed between the press and the laminate. Once the laminate is at or above its melt temperature, the press ram pushes core 16 into the laminate for bonding thereto. At the melt temperature of laminate 14, one surface 18 of core 16 makes intimate contact with the thermoplastic of the laminate and on cooling is bonded thereto.

Figure 3:
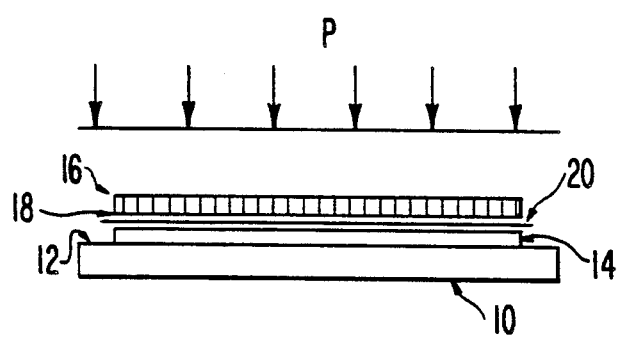
FIG. 3 is a schematic side view of an apparatus for performing the first steps of another embodiment of the invention.

Some high temperature laminates may not have sufficient resin to effect adequate bonding to core 16. In the such event, the alternative embodiment depicted in FIG. 3 may be used. In this embodiment, supplementary resin material 20 is disposed between one surface 18 of core 16 and laminate 14. Supplementary resin material 20, which may be in a film or granular form, melts on to the surface of heated laminate 14 to effect bonding of core 16 thereto.

Figure 2:
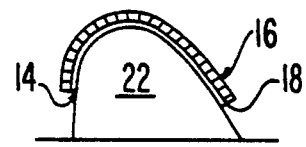
FIG. 2 is a schematic side view of the apparatus for performing the last step of the first embodiment of the invention.

In accordance with the invention, the process includes the steps of removing the bonded core and laminate from the heat source, and forming the shaped structure on a molding tool, the laminate being disposed adjacent the tool. After core 15 is pressed into contact with heated laminate 14, the core provides sufficient structural support for the laminate to permit removal of the bonded structure from heat source 10. As depicted in FIG. 2, core 16 with laminate 14 adhered to one surface 18 thereof is then disposed between molding tool 22 and a press (not shown). Laminate 14 is disposed adjacent tool 22. The ram press presses the core on the other surface 24 thereof to conform the structure to the desired shaped represented by tool 22. The molding tool sets laminate 14 in bonded relationship with one surface of core 16 while forming the desired shape. The tool 22 may be a temperature controlled mold or a form setting mold.

Figure 5:
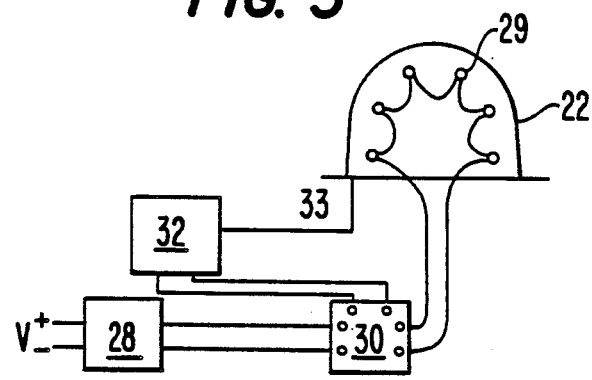
FIG. 5 is a schematic view of an embodiment of a molding tool for performing the last steps of the invention.

In an embodiment depicted in FIG. 5, a temperature controlled EDV molding tool comprises heating elements 29 disposed in the mold 22, controlled by temperature controller 32, contactors 28,30 and thermocouple 32. The temperature of the mold can be below freeze, melt or the glass transition temperature of the laminate, for example, room temperature to 550° F. This cooler temperature allows more time to form the laminate before it freezes and hardens.

Figure 4:
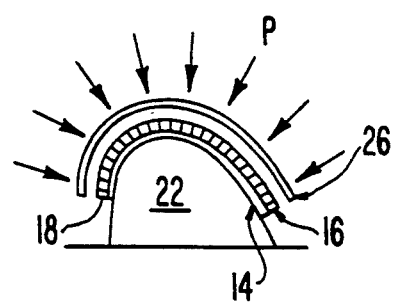
FIG. 4 is a schematic side view of an apparatus for performing the last step of another embodiment of the invention.

In a preferred embodiment depicted in FIG. 4, a second thermoplastic laminate 26 is disposed adjacent the other surface of core 16 during the shaping step. This second laminate may be of the same composition as the first laminate 14 or it may be of a different material. Second laminate 26 is heated to its melt temperature prior to placement on the second surface of core 16. The press then simultaneously presses the second laminate onto core 16 while shaping the structure around mold tool 22.

It will be apparent to those skilled in the art that various modifications and variations could be made to the process of the invention without departing from the scope or spirit of the invention.

What is claimed is:

1. A process for making a shaped structure including a core defining opposed surfaces and a thermoplastic laminate bonded to a surface of the core wherein the melt temperature of the laminate exceeds the service temperature of the core, the core being capable of withstanding transient peak temperatures without damage, the process comprising the sequential steps of:

heating first and second laminates to their respective melt temperatures while spaced from the core;

pressing one surface of said core into a bonding relationship with said first laminate; and conforming said first laminate and core together to the shape of a molding tool, the first laminate being adjacent the molding tool, and simultaneously pressing the second laminate into a bonding relationship with the other surface of the core, the molding tool having a temperature below the melt temperature of said laminates simultaneously to form said shaped structure and to set the laminates and core into bonded relationship.

2. The process of claim 1 wherein said heating step includes disposing said first laminate on a controllable heat source and wherein the first pressing step is performed while said first laminate is on said heat source in a manner which limits transient peak temperatures to avoid damage to the core.

3. The process of claim 1 also including the step of disposing a thermoplastic film between said first laminate and said core during said first pressing step as a resin supplement for a resin-deficient laminate.

4. The process of claim 1 wherein said core is formed of a material selected from the group comprising aramid fibers, aluminum, and phenolic.

5. The process of claim 1 wherein said core is formed of material capable of withstanding transient peak temperatures of about 700° F. without damage.

6. The process of claim 1 wherein said core comprises a honeycomb structure.

7. The process of claim 1 wherein at least one thermoplastic laminate is formed of a material selected from the group comprising polyphenylene sulfide, polyetheretherketone and polyetheramide.

8. The process of claim 1 wherein at least one thermoplastic laminate has a melt temperature above about 600° F.

9. The process of claim 1 further including the step of heating the molding tool to a temperature selected to delay hardening of the first laminate sufficiently to permit conforming the laminate and core to the tool.

10. The process of claim 1 further including the step of heating the molding tool to a temperature between room temperature and 550° F.

11. The product made using the process of claim 10.

12. A process for making a shaped structure comprising the sequential steps of:

heating a first thermoplastic laminate to its melt temperature, said first laminate being formed of a material selected from the group of polyphenylene sulfide, polyetheretherketone and polyetheramide;

pressing a first surface of a generally planar core into a bonding relationship with the first laminate, the core being a honeycomb structure formed of a material selected from the group of aluminum, phenolic and nylon;

heating a second thermoplastic laminate to its melt temperature; and conforming the first laminate and core to a non-planar molding tool and simultaneously pressing the second thermoplastic laminate into a bonded relationship with an opposed second surface of the core, the molding tool having a temperature less than the melt temperature of the first laminate, simultaneously to form said shaped structure and to set the laminate and core in bonded relationship.

13. The process of claim 12 wherein the temperature of said molding tool is below the glass transition temperature of the first laminate.

14. The process of claim 12 wherein the temperature of said molding tool is between room temperature and 550° F.

15. A shaped structure made using the process of claim 12.

* * * * *